(12) United States Patent
Kruglick

(10) Patent No.: US 9,354,855 B2
(45) Date of Patent: May 31, 2016

(54) CO-LOCATING REMOTELY-SERVED APPLICATION PROGRAMMING INTERFACE INSTANCES

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 28 days.

(21) Appl. No.: 14/351,829

(22) PCT Filed: Apr. 17, 2013

(86) PCT No.: PCT/US2013/037029
§ 371 (c)(1),
(2) Date: Apr. 14, 2014

(87) PCT Pub. No.: WO2014/171939
PCT Pub. Date: Oct. 23, 2014

(65) Prior Publication Data
US 2015/0089492 A1 Mar. 26, 2015

(51) Int. Cl.
*G06F 9/44* (2006.01)
*G06F 9/445* (2006.01)
*G06F 9/50* (2006.01)
*G06F 9/54* (2006.01)

(52) U.S. Cl.
CPC .. *G06F 8/61* (2013.01); *G06F 8/36* (2013.01); *G06F 9/5072* (2013.01); *G06F 9/542* (2013.01)

(58) Field of Classification Search
None
See application file for complete search history.

(56) References Cited

U.S. PATENT DOCUMENTS

| 7,958,518 | B1 | 6/2011 | Willeford | |
|---|---|---|---|---|
| 8,539,515 | B1* | 9/2013 | Protassov et al. | 719/321 |
| 2010/0106812 | A1 | 4/2010 | Bernabeu-Auban et al. | |
| 2010/0250499 | A1 | 9/2010 | Mcalister et al. | |
| 2011/0154212 | A1* | 6/2011 | Gharpure et al. | 715/738 |
| 2012/0041991 | A1* | 2/2012 | Shrufi et al. | 707/805 |
| 2012/0158556 | A1 | 6/2012 | Said et al. | |
| 2012/0185840 | A1 | 7/2012 | Fuller et al. | |
| 2012/0192146 | A1 | 7/2012 | Arnold et al. | |

OTHER PUBLICATIONS

Kosner, A.W., "Amazon Cloud Goes Down Friday Night, Taking Netflix, Instagram and Pinterest With it," updated on Jun. 30, 2012, accessed at http://www.forbes.com/sites/anthonykosner/2012/06/30/amazon-cloud-goes-down-friday-night-taking-netflix-instagram-and-pinterest-with-it/, accessed on Dec. 20, 2013, pp. 1-7.

(Continued)

*Primary Examiner* — Wei Zhen
*Assistant Examiner* — Timothy Duncan
(74) *Attorney, Agent, or Firm* — Turk IP Law, LLC

(57) ABSTRACT

Technologies are provided for locally installing remotely-served API instances. In some examples, a scale-out service may receive a request to provide an installation of a remotely-served API at a particular datacenter. In response to a determination by the scale-out service that a local instance of the remotely-served API can be installed at that datacenter, the scale-out service may install the local instance and route requests to that API from the datacenter to the local instance instead of the remotely-served API.

23 Claims, 8 Drawing Sheets

(56) References Cited

OTHER PUBLICATIONS

Marsan, C.D., "DeepField Networks exits stealth mode to reveal cloud genome mapping," p. 2, updated on Jul. 31, 2012, accessed at http://www.networkworld.com/news/2012/073112-deepfield-261260.html?page=2, accessed on Dec. 20, 2013, pp. 1-2.

Marsan, C.D., "DeepField Networks exits stealth mode to reveal cloud genome mapping," p. 1, updated on Jul. 31, 2012, accessed at http://www.networkworld.com/news/2012/073112-deepfield-261260.html?page=1 , accessed on Dec. 20, 2013, pp. 1-3.

"Keyword Extraction API," accessed at http://www.alchemyapi.com/api/keyword/, accessed on Dec. 20, 2013, pp. 1-2.

Goldman, D., "Why Amazon's cloud Titanic went down," updated on Apr. 22, 2011, accessed at http://money.cnn.com/2011/04/22/technology/amazon_ec2_cloud_outage/index.htm, accessed on Dec. 20, 2013, pp. 1-4.

"Deep Analytics & Unprecedented Cloud Intelligence," accessed at http://www.deepfield.net/, accessed on Dec. 20, 2013, pp. 1-5.

Rubin, E., "Cloud Federation and the Intercloud," updated on Jan. 25, 2010, accessed at http://cloudcomputing.sys-con.com/node/1249746, accessed on Dec. 20, 2013, pp. 1-5.

Darrow, B., "AppFog lets you pick your cloud, (almost) any cloud," updated on Jul. 25, 2012, accessed at http://gigaom.com/cloud/appfog-lets-you-pick-your-cloud-almost-any-cloud/, accessed on Dec. 20, 2013, pp. 1-4.

Barton, M., "Amazon, Eucalyptus Team on Hybrid Cloud," updated on Mar. 22, 2012, accessed at http://www.wired.com/cloudline/2012/03/amazon-eucalyptus/, accessed on Dec. 20, 2013, pp. 1-5.

Krause, R., "VMware to Join Cloud Initiative Led by Rackspace," updated on Aug. 27, 2012, accessed at http://news.investors.com/article/623584/201208271147/vmware-joins-cloud-openstack-boosting-rackspace.htm, accessed on Dec. 20, 2013, pp. 1-3.

Raleigh, "Red Hat Announces Preview Version of Enterprise-Ready OpenStack Distribution," updated on Aug. 13, 2012, accessed at http://www.redhat.com/about/news/press-archive/2012/8/red-hat-announces-preview-version-of-enterprise-ready-openstack-distribution, accessed on Dec. 20, 2013, pp. 1-2.

Hernandez, P., "Piston Builds Airframe for OpenStack Private Clouds," updated on Aug. 22, 2012, accessed at http://www.datamation.com/cloud-computing/piston-builds-airframe-for-openstack-private-clouds.html, accessed on Dec. 20, 2013, p. 1.

"Auto Scaling," accessed at http://aws.amazon.com/autoscaling/, accessed on Dec. 20, 2013, pp. 1-3.

"Why App Engine?," accessed at https://developers.google.com/appengine/whyappengine, accessed on Dec. 20, 2013, p. 1.

"Scaling Your Dyno Formation," updated on Jun. 6, 2013, accessed at https://devcenter.heroku.com/articles/scaling, accessed on Dec. 20, 2013, pp. 1-3.

"Amazon Route 53," accessed at http://aws.amazon.com/route53/, accessed on Dec. 20, 2013, pp. 1-6.

International Search Report and Written Opinion for International Patent Application No. PCT/US13/37029 mailed Nov. 5, 2013.

\* cited by examiner

CO-LOCATING REMOTELY-SERVED APPLICATION PROGRAMMING INTERFACE INSTANCES

CROSS REFERENCE TO RELATED APPLICATION

This application is the U.S. National Stage filing under 35 U.S.C §371 of International Application No. PCT/US2013/37029, filed on Apr. 17, 2013, the disclosure of which is hereby incorporated by reference for all purposes.

BACKGROUND

Unless otherwise indicated herein, the materials described in this section are not prior art to the claims in this application and are not admitted to be prior art by inclusion in this section.

As web services and service providers proliferate, many web applications can be assembled rapidly from the many commercial services available. For example, an e-commerce web application may be assembled from multiple service providers each providing particular functionality (e.g., authentication, user interfaces, social networking, payment processing, etc.) or from a single service provider who in turn aggregates services from other service providers.

One of the outcomes from this distributed service architecture may be that many users are unaware of which actual hardware they are dependent on. Thus, this distributed structure may have many points of failure, and a web application relying on multiple services may fail if even one associated datacenter goes down. For example, an outage at a datacenter hosting one application or module may take down many applications that are not even aware that they depend on the particular application/module because the relationship is transparent to those applications. In some scenarios, sub-services with over a billion requests per month may exist on single datacenters for better margins.

SUMMARY

The present disclosure generally describes techniques for locally installing remotely-served application programming interface (API) instances.

According to some examples, a method is provided for locally installing remotely-served API instances. The method may include receiving a request for a local datacenter to install a local instance of an API served from a remote API provider, installing the local instance of the API at the local datacenter in response to a determination that the local instance of the API can be installed at the local datacenter, and routing subsequent requests from a same source that provided the request to the local instance of the API.

According to other examples, a scale-out service is provided for locally installing remotely-served API instances. The service may include a request handler, a processing module, and a package deployer. The request handler may be configured to receive a request for a local datacenter to install a local instance of an API served from a remote API provider. The processing module may be configured to determine that the local instance of the API can be installed at the local datacenter and route subsequent requests from a customer that provided the request to the local instance of the API. The package deployer may be configured to install the local instance of the API at the local datacenter.

According to further examples, a cloud-based datacenter is provided for locally installing remotely-served API instances. The datacenter may include a datacenter controller and at least one virtual machine (VM) operable to be executed on one or more physical machines. The datacenter controller may be configured to receive a request for the datacenter to install a local instance of an API served from a remote API provider, install the local instance of the API on the at least one VM in response to a determination that the local instance of the API can be installed on the at least one VM, and routing subsequent requests to the API from a customer that provided the request to the local instance of the API.

According to yet further examples, an API instance co-location service is provided for co-locating API instances for a customer. The service may include a mapping service, a processing module, and a scale-out service. The mapping service may be configured to identify a first API used by the customer and installed at a first datacenter and a second API used by the customer and installed at a second datacenter. The processing module may be configured to determine whether the first API and the second API can be co-located at the first datacenter. The scale-out service may be configured to install an instance of the second API at the first datacenter in response to a determination that the first API and the second API can be co-located at the first datacenter.

According to some examples, a computer readable medium may store instructions for locally installing remotely-served API instances. The instructions may include receiving a request for a local datacenter to install a local instance of an API served from a remote API provider, installing the local instance of the API at the local datacenter in response to a determination that the local instance of the API can be installed at the local datacenter, and routing subsequent requests from a same source that provided the request to the local instance of the API.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
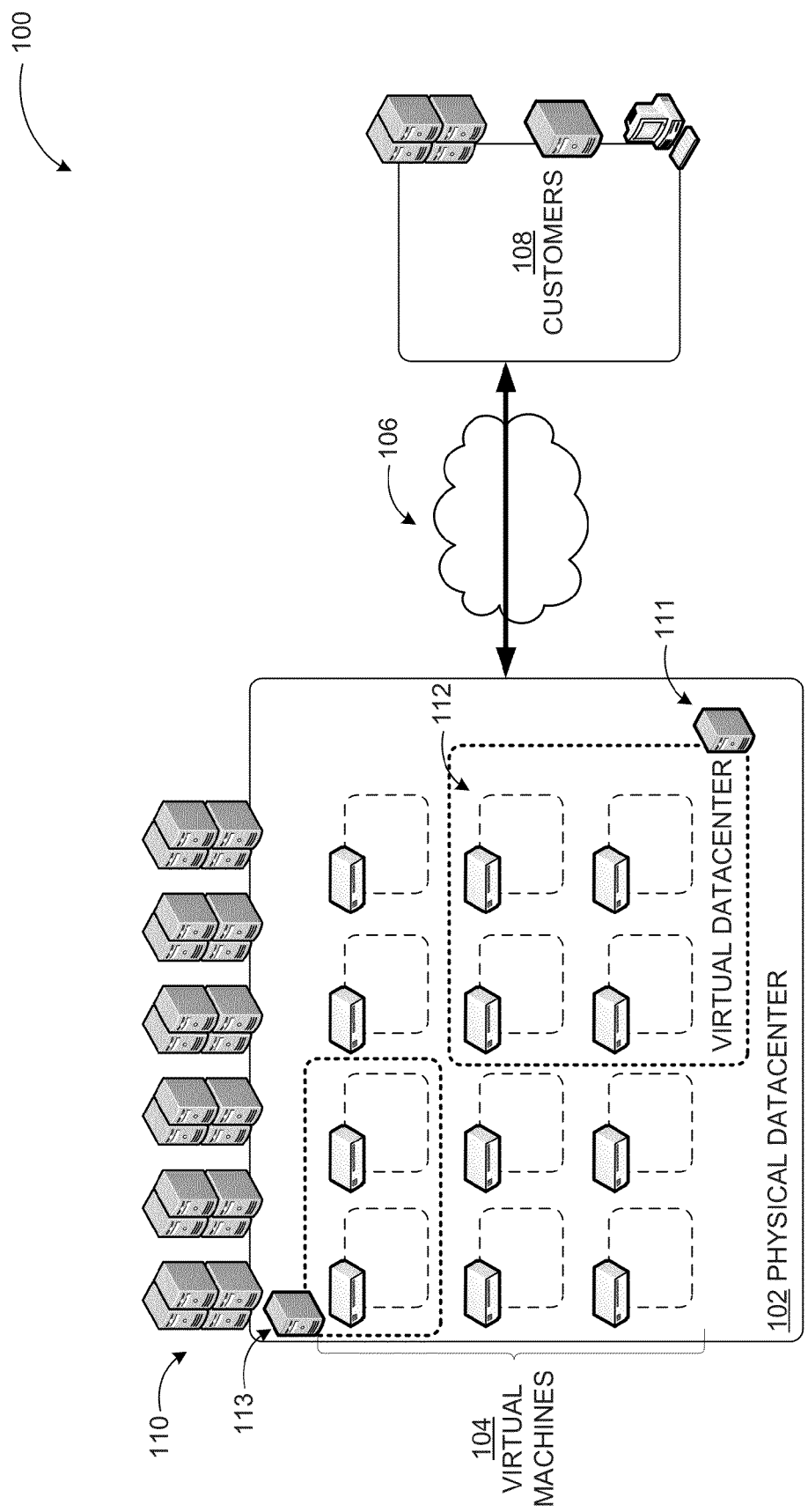
FIG. 1 illustrates an example datacenter-based system where local installations of remotely-served API instances may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to locally installing remotely-served API instances.

Briefly stated, technologies are generally described for locally installing remotely-served API instances. In some examples, a scale-out service configured to increase scalability of servers in a datacenter environment by locally installing remotely-served API instances may receive a request to provide an installation of a remotely-served API at a particular datacenter. In response to a determination by the scale-out service that a local instance of the remotely-served API can be installed at that datacenter, the scale-out service may install the local instance and route requests to that API from the datacenter to the local instance instead of the remotely-served API.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users. Customers may also be internal customers of an organization, for example, departments with an organization that share the services of a datacenter operated by the organization (e.g., company). An example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with conventional configurations, where each service provider would execute their applications and have their users access those applications on the retail services own servers physically located on retail service premises. One result of the networked approach as described herein is that customers like the retail service may move their hosted services/applications from one datacenter to another without the users noticing a difference.

FIG. 1 illustrates an example datacenter-based system where local installations of remotely-served API instances may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via one or more network such as a network 106.

Example embodiments enable automatically allowing API users to know whether their datacenter is capable of executing a local copy of the API at a datacenter server and requesting and causing such a local copy to be executed. As a result, API users may be informed on how many subservices and associated datacenters their datacenter is dependent on. Since dependency on many datacenters may be associated with reliability concerns, multi-datacenter reliability concerns for API users may be reduced. In some examples, a scale-out service at a datacenter may manage stored copies of API installations, availability tables, and a pricing table, and accept customer API-based requests to launch a local instance of a service hosted by the datacenter.

Figure 2:
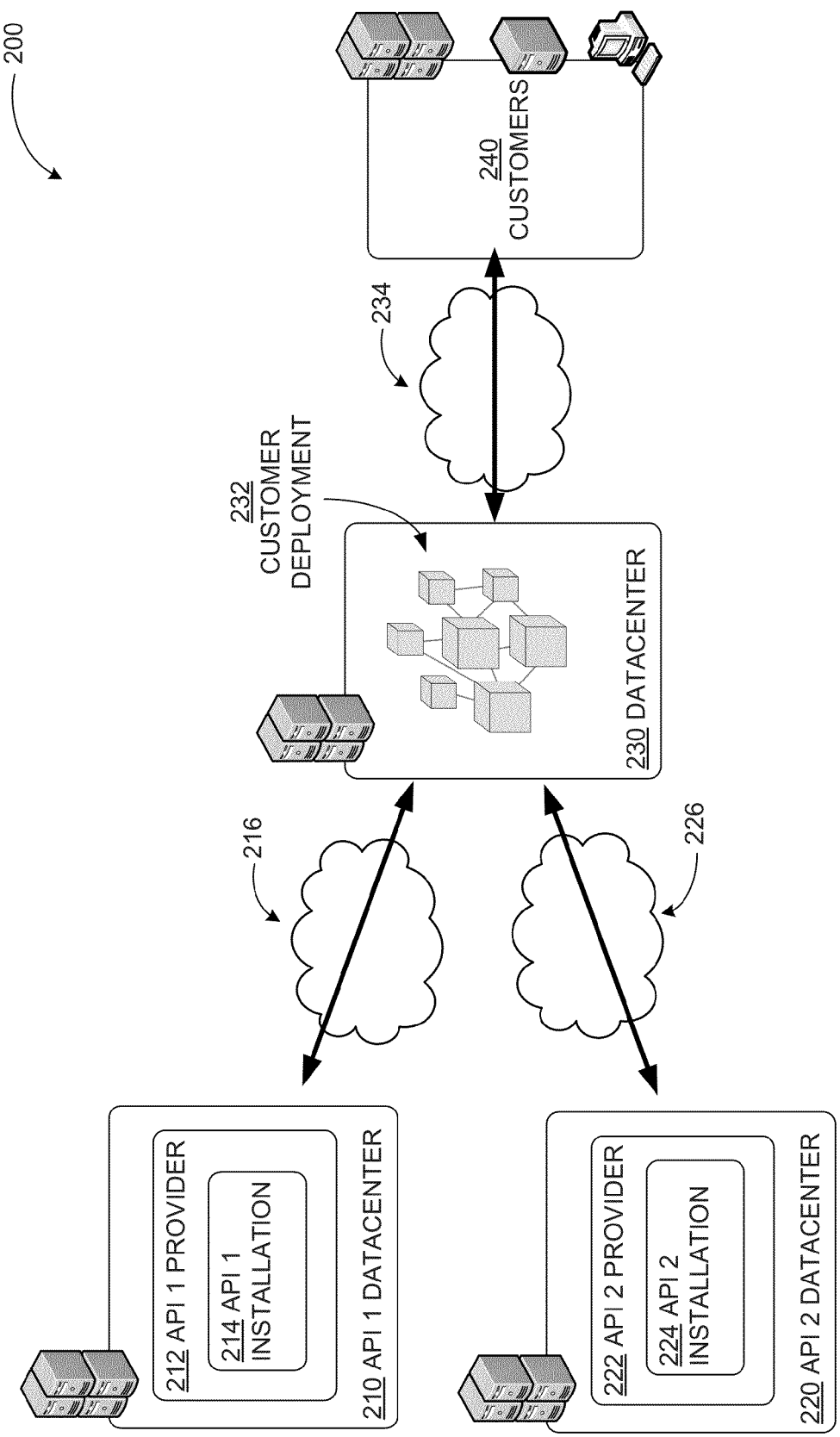
FIG. 2 illustrates an example datacenter-based system having remotely-served API instances.

FIG. 2 illustrates an example datacenter-based system having remotely-served API instances, arranged in accordance with at least some embodiments described herein.

As shown in a diagram 200, a customer deployment 232 (e.g., a customer service or application) may execute on one or more virtual machines in a datacenter 230, similar to the physical datacenter 102 in FIG. 1. The customer deployment 232 may provide data or computing services to a group of customers 240, similar to the customers 108 in FIG. 1, via a network 234. In some embodiments, in order to provide its own services, the customer deployment 232 may rely on other services or applications provided by other entities or datacenters, often in the form of application programming interfaces (APIs). For example, the customer deployment 232 may rely on a service provided by an API 1 provider 212 hosted on an API 1 datacenter 210. The API 1 provider 212 may provide the service as a remotely-served API 1 installation 214 located at the API 1 datacenter 210, and the customer deployment 232 may access the remotely-served API 1 installation 214 via a network 216. The customer deployment 232 may rely on another service provided by an API 2 provider 222 hosted on an API 2 datacenter 220. Similarly, the API 2 provider 222 may provide the other service as a remotely-served API 2 installation 224 located at the datacenter 220, and the customer deployment 232 may access the remotely-served API 2 installation 224 via a network 226.

As discussed above, a customer deployment (e.g., the customer deployment 232) may gain flexibility and scalability by tying services and APIs from different providers (e.g., the remotely-served API 1 installation 214 and the remotely-served API 2 installation 224) together. However, by doing so, the customer deployment may become more vulnerable to failures due to datacenter downtimes. For example, if the customer deployment 232 only relies on services and applications on the datacenter 230, then the customer deployment 232 may fail if the datacenter 230 goes down. However, if the customer deployment 232 also relies on the remotely-served API 1 installation 214 at the API 1 datacenter 210, then the customer deployment 232 may fail if the datacenter 230, the API 1 datacenter 210, and/or the network 216 go down. Similarly, if the customer deployment 232 relies on the remotely-served API 1 installation 214 at the API 1 datacenter 210 and the remotely-served API 2 installation 224 on the API 2 datacenter 220, the customer deployment 232 may fail once any of the datacenters 210, 220, and 230 or the networks linking the datacenters goes down. Thus, relying on remotely-served API installations at other datacenters significantly may increase the number of potential points of failure.

Figure 3:
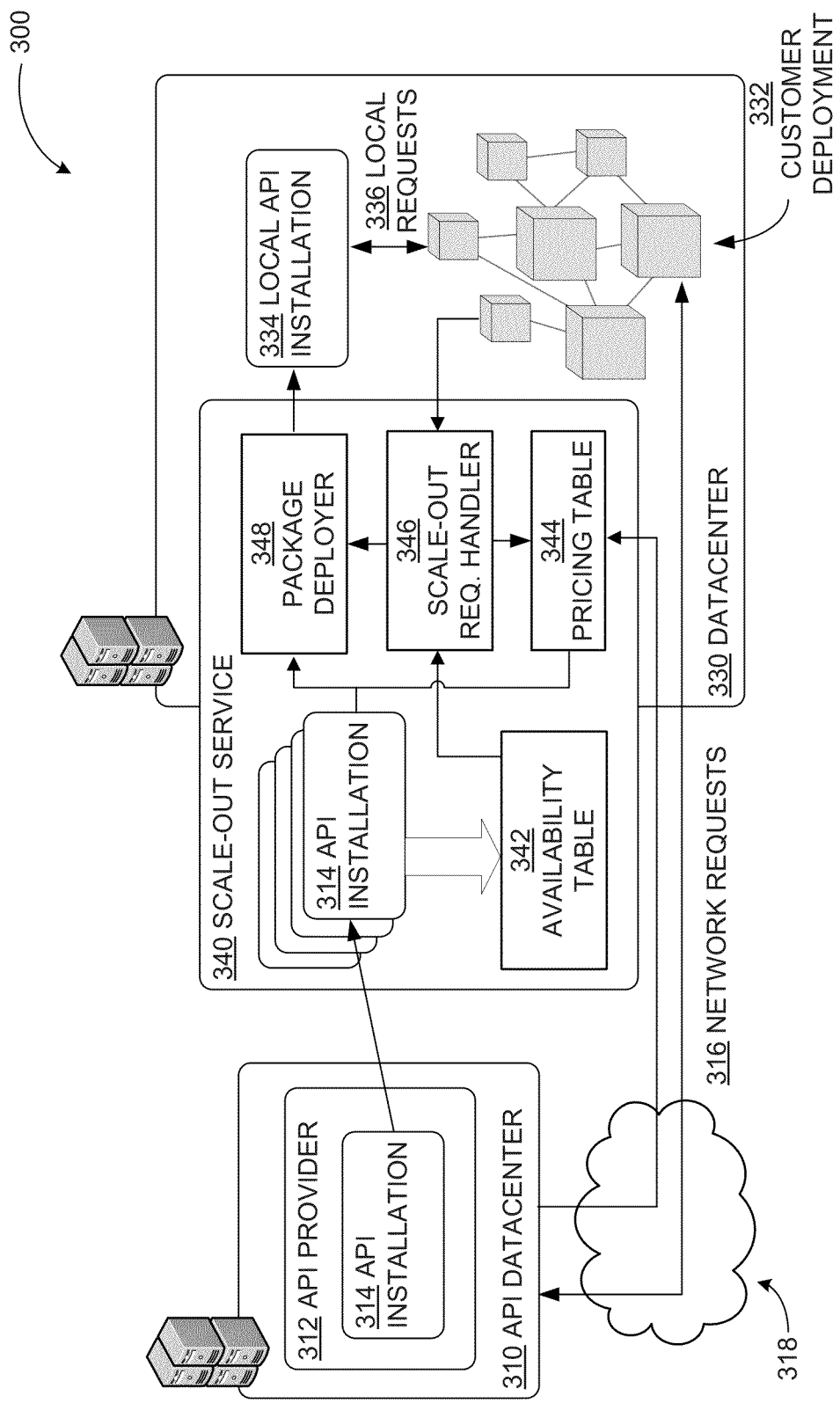
FIG. 3 illustrates an example datacenter-based system with a scale-out service for locally installing remotely-served API instances.

FIG. 3 illustrates an example datacenter-based system with a scale-out service for locally installing remotely-served API instances, arranged in accordance with at least some embodiments described herein.

As shown in a diagram 300, a customer deployment 332 (similar to the customer deployment 232) may execute at a datacenter 330 (similar to the datacenter 230). The customer deployment 332 may rely on a remotely-served API installation 314 (similar to, e.g., the API 1 installation 214) provided by an API provider 312 (similar to, e.g., the API 1 provider 212) at an API datacenter 310 (similar to, e.g., the API 1 datacenter 210). In some embodiments, the customer deployment 332 may exchange data with the remotely-served API installation 314 via network requests 316 routed through a network 318 (similar to, e.g., the network 216).

In some embodiments, the owner of the customer deployment 332 may request that a local instance of the remotely-served API installation 314 be provided at the datacenter 330. For example, the customer deployment 332 owner may make the request to decrease the potential points of failure (as described above) and/or to reduce communication latency (e.g., by removing the need to make the network requests 316 through the network 318).

A scale-out service 340 may receive the request from the owner of the customer deployment 332 to install and execute a local instance of the remotely-served API installation 314. The scale-out service 340, which in some embodiments may be at least partly implemented at the datacenter 330 and partly implemented elsewhere (e.g., at another datacenter or even at the API datacenter 310), may have access to a number of API installations, such as API installation 314. The scale-out service 340 may store local copies of API installations or may have access to (e.g., store pointers to) remote copies of API installations. For example, the scale-out service 340 may store a local copy of the API installation 314, or may store a pointer pointing to the remotely-served API installation 314 located at the API provider 312/API datacenter 310. The "local" copy of an API installation may be located at the datacenter 330 or another datacenter associated with the scale-out service 340.

When the scale-out service 340 receives the local installation request for the API installation 314, for example via a scale-out request handler 346, the scale-out service 340 may check an availability table 342. The availability table 342 may store information regarding the API installations that the scale-out service 340 is authorized or able to install at a particular datacenter, such as the datacenter 330. If the requested API installation 314 can be installed at the datacenter 330, the scale-out service 340 may use a package deployer 348 to install a local API installation 334 at the datacenter 330 from the stored local copy or pointer, as described above. Subsequently, the datacenter 330 may be configured to route requests from the customer deployment 332 to the remotely-served API installation 314 to the local API installation 334. For example, if a requested remotely served API is available through a local installation (e.g., as determined from a mapping table), the scale-out service 340 may intercept the network requests 316 to the remotely served API and convert them into local requests 336. Thus, the customer deployment 332 may not have to rely on the API provider 312 to be available increasing a reliability of the service provided by the datacenter 330.

In some embodiments, the scale-out service 340 may use a pricing table 344 that includes pricing information for local API installations in order to charge the local installation requester (e.g., the owner of the customer deployment 332) accordingly. The pricing table 344 may include pricing information provided by the API provider 312, the scale-out service 340, and/or the datacenter 330, and may be based on a simple premium, a cost-of-operations (e.g., at the datacenter 330 or for the API provider 312), an API subscription price, or any other suitable pricing data.

While only one remotely-served API installation (the API installation 314) and API provider (the API provider 312) is shown in FIG. 3, in other embodiments the scale-out service 340 may be configured to provide local installation of multiple APIs, provided by multiple, different API providers. In some embodiments, a local installation of an API (e.g., the local API installation 334) may be made available to other customers, for example other customers of the datacenter 330. This may additionally benefit the remote API provider, because the availability of another instance of the API may distribute datacenter loading and provide redundancy. In some embodiments, Domain Name System (DNS) servers for the remote API provider may be updated to take advantage of the multiple API instances. In other embodiments, the remote API provider may not even be aware of the exact datacenter with the local API installation. While the scale-out service 340 may report to the remote API provider 312 that a local instance of the API installation 314 is being provided, it may not necessarily provide other information. For example, the scale-out service 340 may not provide information about the datacenter 330, the customer deployment 332, and/or the local instance installation requester to the API provider 312.

Figure 4:
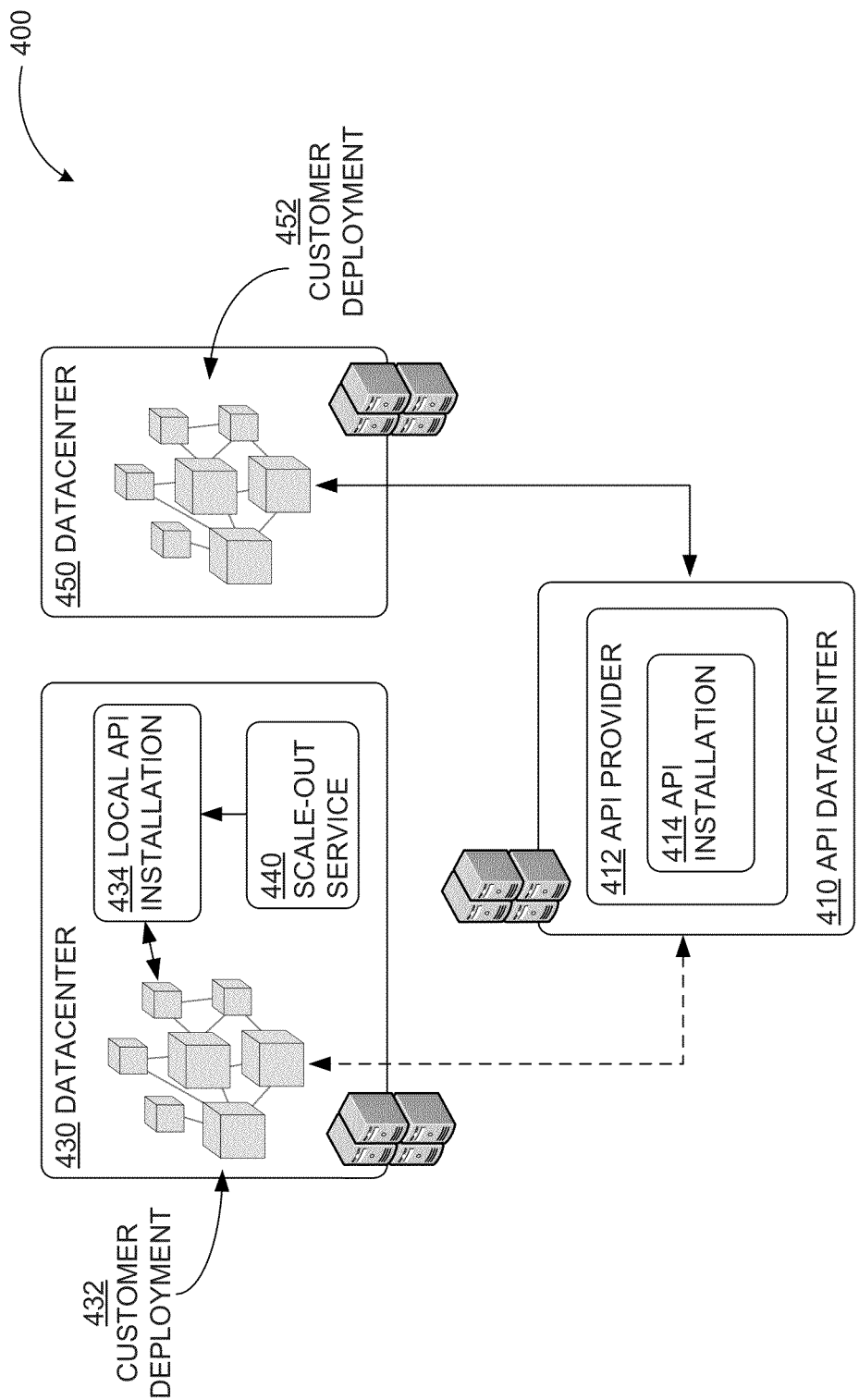
FIG. 4 illustrates example datacenters where the scale-out service of FIG. 3 may be used to locally install a remotely-served API instance.

FIG. 4 illustrates example datacenters where the scale-out service of FIG. 3 may be used to locally install a remotely-served API instance, arranged in accordance with at least some embodiments described herein.

According to a diagram 400, a customer deployment 432 at a datacenter 430 may rely on a service provided by an API provider 412 via a remotely-served API installation 414 at an API datacenter 410. Similarly, a customer deployment 452 at a datacenter 450 may also rely on the same service provided by the API provider 412. The datacenter 430 may implement a scale-out service 440 similar to the scale-out service 340, whereas the datacenter 450 may not implement a scale-out service. Accordingly, a local API installation 434 of the remotely-served API installation 414 may be provided at the datacenter 430 by the scale-out service 440, and the customer deployment 432 may be able to make requests locally to the local API installation 434 instead of having to make network requests to the remotely-served API installation 414, thus reducing the number of potential points of failure and potentially decreasing latency. On the other hand, the customer deployment 452 at the datacenter 450 may still be forced to make network requests to the remotely-served API installation 414, and may remain susceptible to failures at the API datacenter 410 and/or the network connecting the datacenter 450 and the API datacenter 410.

Figure 5:
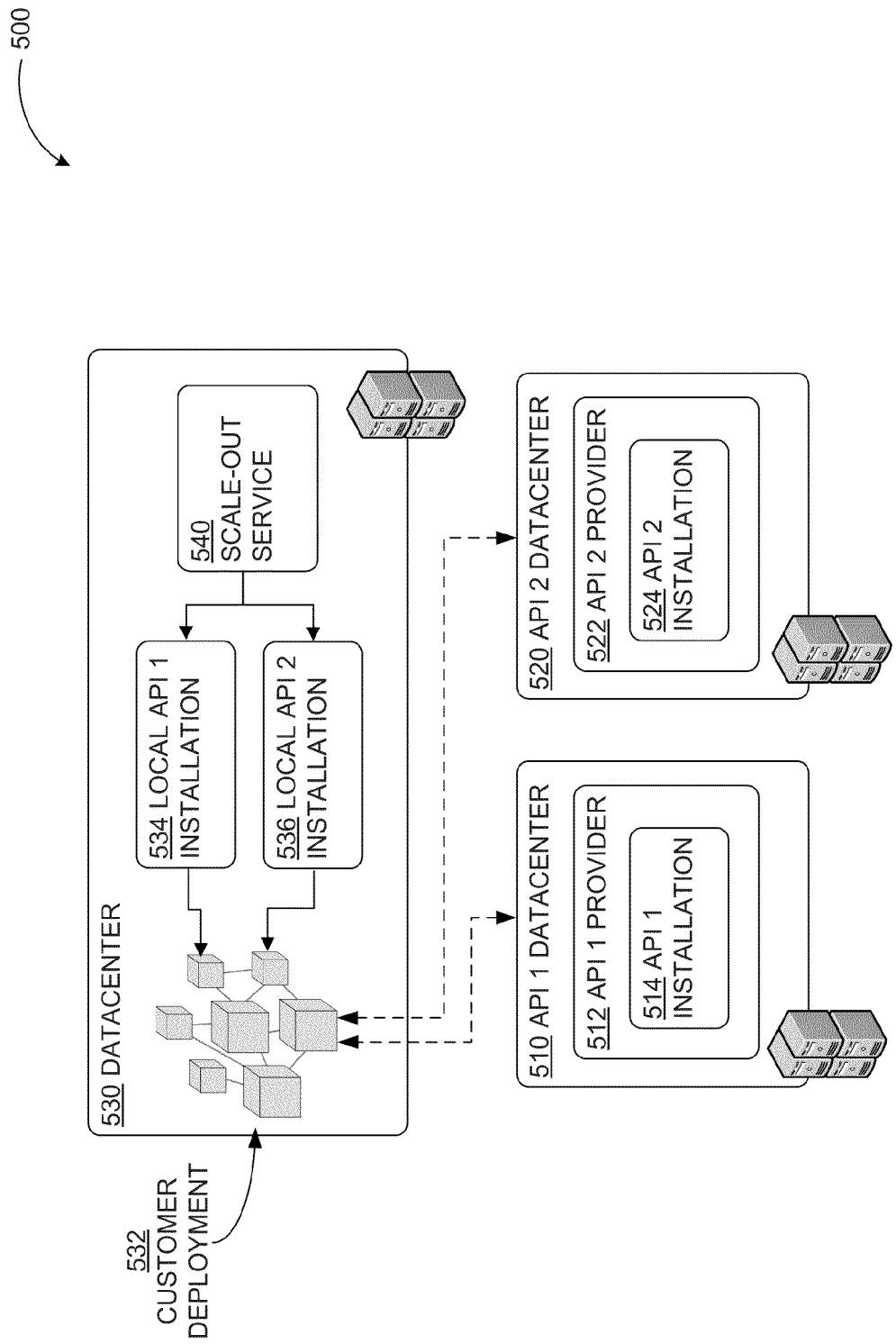
FIG. 5 illustrates an example datacenter where the scale-out service of FIG. 3 may be used to locally install multiple remotely-served API instances.

FIG. 5 illustrates an example datacenter where the scale-out service of FIG. 3 may be used to locally install multiple remotely-served API instances, arranged in accordance with at least some embodiments described herein.

As shown in a diagram 500, a customer deployment 532 at a datacenter 530 may rely on two remotely-served APIs, an API 1 installation 514 provided by an API 1 provider 512 at an API 1 datacenter 510 and an API 2 installation 524 provided by an API 2 provider 522 at an API 2 datacenter 520. As with the datacenter 430, the datacenter 530 may implement a scale-out service 540 similar to the scale-out service 440. If requested, a local API 1 installation 534 of the remotely-served API 1 installation 514 and a local API 2 installation 536 of the remotely-served API 2 installation 524 may be provided at the datacenter 530 by the scale-out service 540. The customer deployment 532 may then be able to make requests locally to the local API 1 installation 534 and the local API 2 installation 536 instead of having to make network requests to their corresponding remotely-served API installations. As a result, the potential points of failure of the customer deployment 532 may be significantly reduced (from three datacenters and associated networks to one datacenter).

In some embodiments, a scale-out service as described above may be provided to a customer along with other, associated services, such as a mapping service. The mapping service may allow the owner of a customer deployment to identify the different APIs used by the customer deployment and their locations. The mapping service may then provide this information to the scale-out service, which may then determine if any consolidation of API instances can be performed. For example, the mapping service may determine that a customer deployment at one datacenter relies on three different APIs remotely-served from three different datacenters. The scale-out service may then determine if any of the three different APIs can be co-located with any other API (or the customer deployment) at one datacenter, as described above. If so, the scale-out service may proceed to consolidate the APIs and customer deployment as described above, thereby reducing the total number of datacenters involved and reducing the number of potential points of failure.

Figure 6:
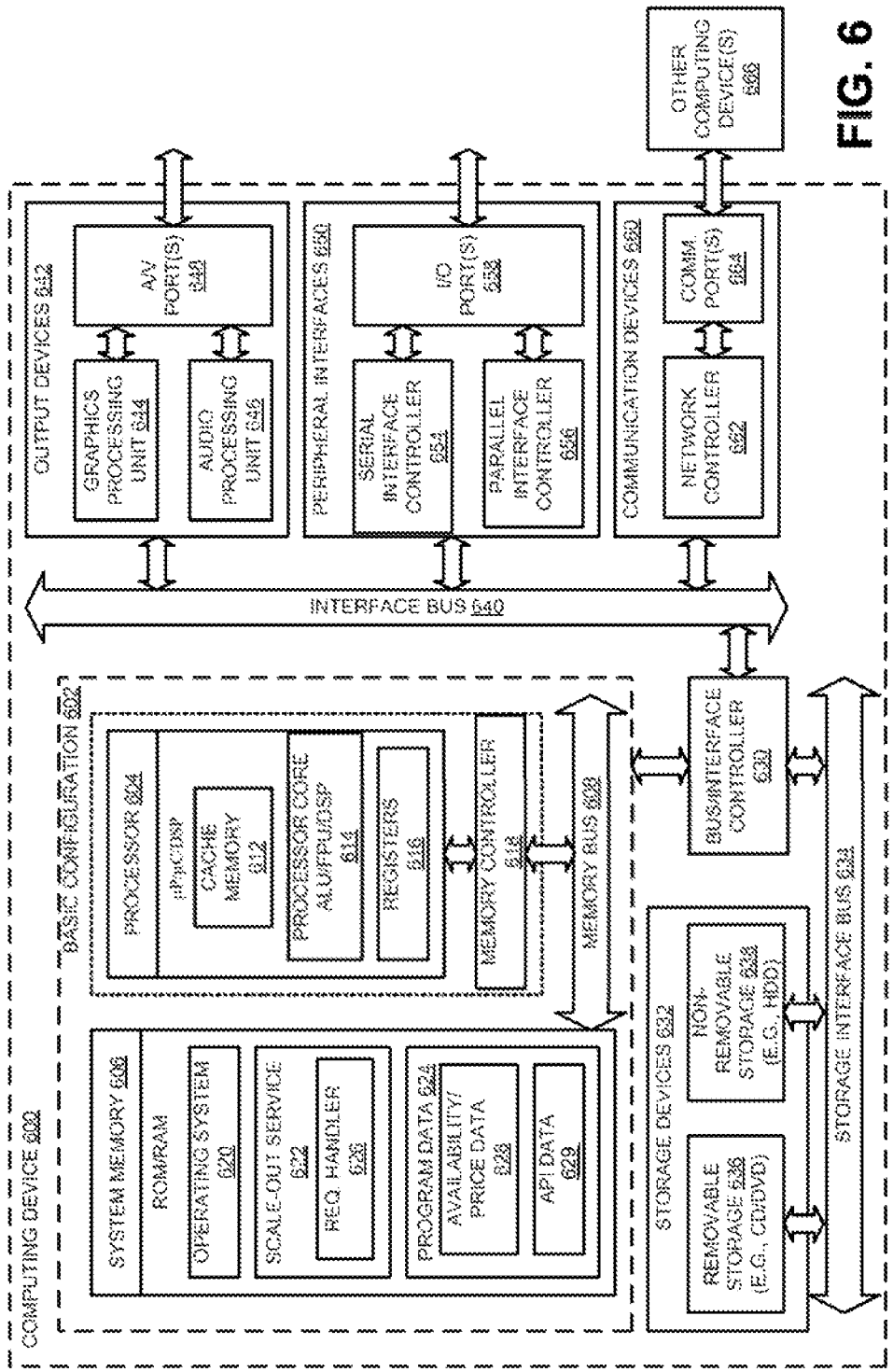
FIG. 6 illustrates a general purpose computing device, which may be used to provide local installations of remotely-served API instances.

FIG. 6 illustrates a general purpose computing device, which may be used to provide local installations of remotely-served API instances, arranged in accordance with at least some embodiments described herein.

For example, the computing device 600 may be used to provide local installations of remotely-served API instances as described herein. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a cache memory 612, a processor core 614, and registers 616. The example processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a scale-out service 622, and program data 624. The scale-out service 622 may include a request handler 626 for providing local installations of remotely-served API instances as described herein. The program data 624 may include, among other data, availability/price data 628, API data 629, or the like, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., one or more output devices 642, one or more peripheral interfaces 650, and one or more communication devices 660) to the basic configuration 602 via the bus/interface controller 630. Some of the example output devices 642 include a graphics processing unit 644 and an audio processing unit 646, which may be configured to communicate to various external devices such as a display or speakers via one or more A/V ports 648. One or more example peripheral interfaces 650 may include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 660 includes a network controller 662, which may be arranged to facilitate communications with one or more other computing devices 666 over a network communication link via one or more communication ports 664. The one or more other computing devices 666 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media, A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods for preventing network tomography in software-defined datacenter networks. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 7:
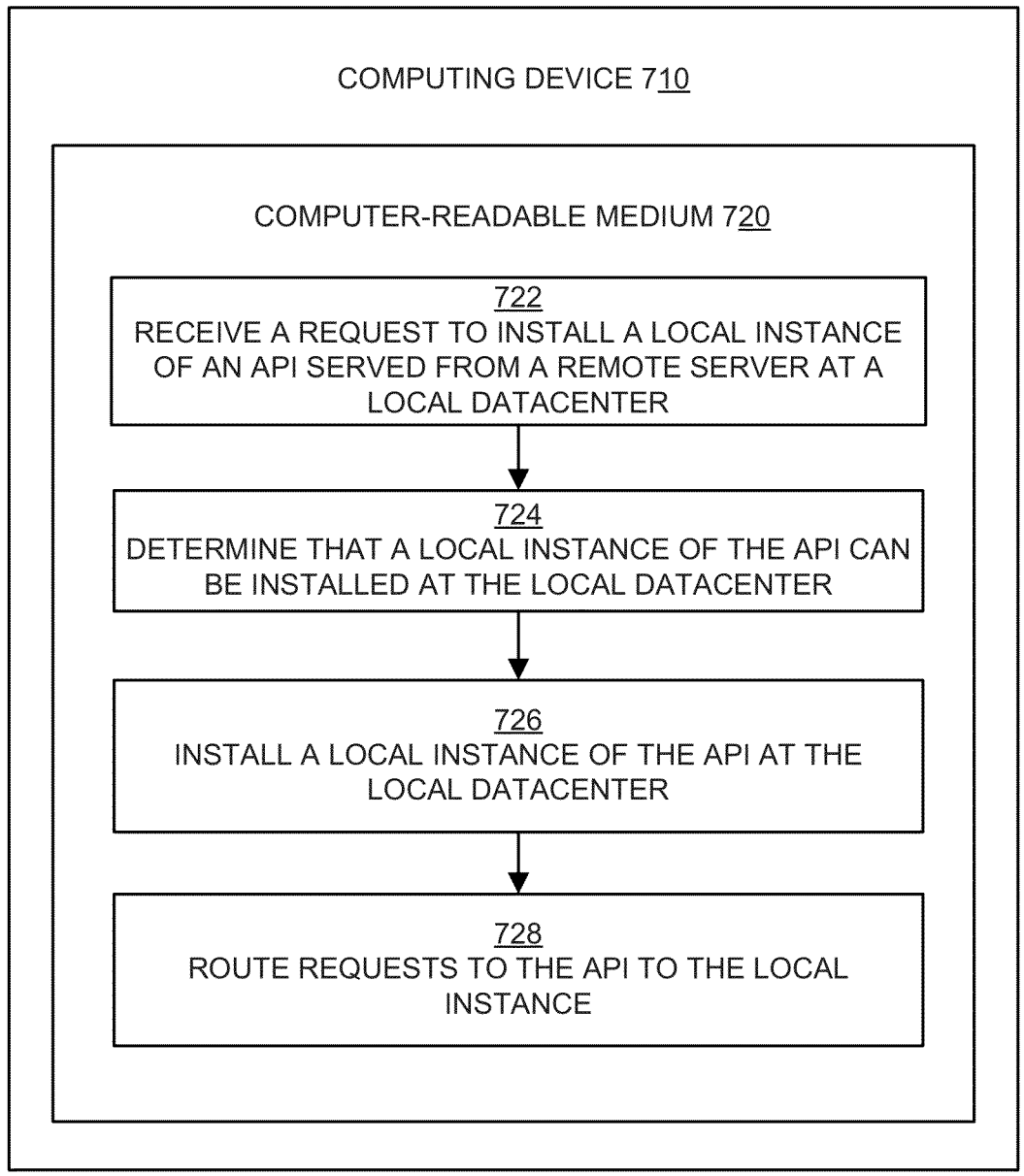
FIG. 7 is a flow diagram illustrating an example method for locally installing remotely-served API instances that may be performed by a computing device such as the computing device in FIG. 6.

FIG. 7 is a flow diagram illustrating an example method for locally installing remotely-served API instances that may be performed by a computing device such as the computing device in FIG. 6, arranged in accordance with at least some embodiments described herein.

Example methods may include one or more operations, functions or actions as illustrated by one or more of blocks 722, 724, 726, and/or 728, and may in some embodiments be performed by a computing device such as the computing device 700 in FIG. 7. The operations described in the blocks 722-728 may also be stored as computer-executable instructions in a computer-readable medium such as a computer-readable medium 720 of a computing device 710.

An example process for locally installing remotely-served API instances may begin at block 722, "RECEIVE A REQUEST TO INSTALL A LOCAL INSTANCE OF AN API SERVED FROM A REMOTE SERVER AT A LOCAL DATACENTER", where a scale-out service (e.g., the scale-out service 340) may receive a request to install an instance of a remotely-served API (e.g., the remotely-served API installation 314) at a particular datacenter (e.g., the datacenter 330). For example, the scale-out service 340 may receive the request from an owner of a customer deployment (e.g., the customer deployment 332) at the particular datacenter.

Block 722 may be followed by block 724, "DETERMINE THAT A LOCAL INSTANCE OF THE API CAN BE INSTALLED AT THE LOCAL DATACENTER", where the scale-out service may determine if the local instance of the remotely-served API can in fact be installed. For example, the scale-out service may use an availability table (e.g., the availability table 342) if determine if the local instance is available and can be (or is authorized to be) installed at the local datacenter.

Block 724 may be followed by block 726, "INSTALL A LOCAL INSTANCE OF THE API AT THE LOCAL DATACENTER", where die scale-out service may install the local instance of the API using a package deployer (e.g., the package deployer 348). For example, the package deployer may use a local copy of the desired API or a pointer to a remote copy of the desired API to install the local API instance.

Finally, block 726 may be followed by block 728, "ROUTE REQUESTS TO THE API TO THE LOCAL INSTANCE", where the local datacenter (e.g., the datacenter 330) or the actual customer deployment (e.g., the customer deployment 332) may route requests to the API to the local instance instead of to the remotely-served API instance. For example, network requests (e.g., the network requests 316) may be intercepted and instead re-routed as local requests (e.g., the local requests 336).

Figure 8:
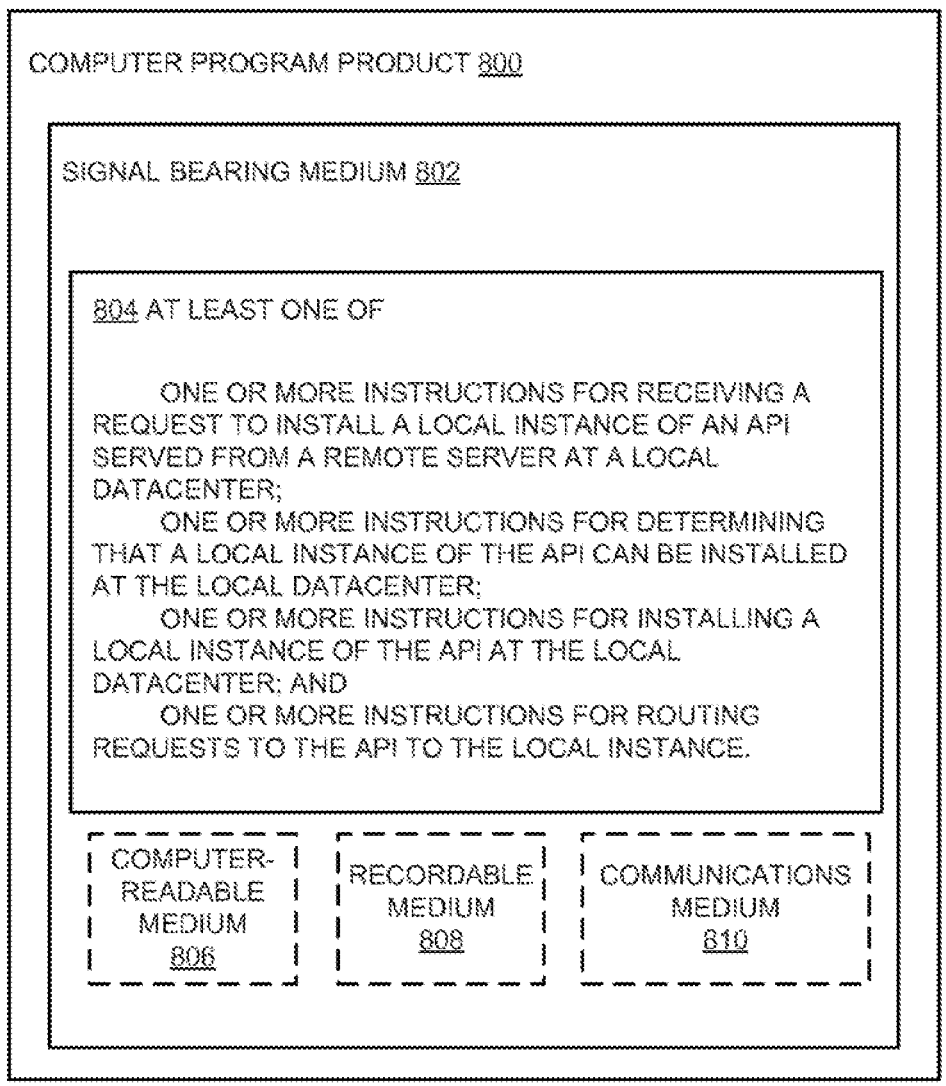
FIG. 8 illustrates a block diagram of an example computer program product, all arranged in accordance with at least some embodiments described herein.

FIG. 8 illustrates a block diagram of an example computer program product, arranged in accordance with at least some embodiments described herein.

In some examples, as shown in FIG. 8, the computer program product 800 may include a signal bearing medium 802 that may also include one or more machine readable instructions 804 that, when executed by, for example, a processor, may provide the functionality described herein. Thus, for example, referring to the processor 604 in FIG. 6, the scale-out service 622 may undertake one or more of the tasks shown in FIG. 8 in response to the instructions 804 conveyed to the processor 604 by the signal bearing medium 802 to perform actions associated with locally installing remotely-served API instances as described herein. Some of those instructions may include, for example, receiving a request to install a local instance of an API served from a remote server at a local datacenter, determining that a local instance of the API can be installed at the local datacenter, installing a local instance of the API at the local datacenter, and/or routing requests to the API to the local instance, according to some embodiments described herein.

In some implementations, the signal bearing medium 802 depicted in FIG. 8 may encompass a computer-readable medium 806, such as, but not limited to, a hard disk drive, a solid state drive, a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the computer program product 800 may be conveyed to one or more modules of the processor 804 by an RF signal bearing medium, where the signal bearing medium 802 is conveyed by the wireless communications medium 810 (e.g., a wireless communications medium conforming with the IEEE 802.11 standard).

According to some examples, a method for locally installing remotely-served application programming interface (API) instances may include receiving a request for a local datacenter to install a local instance of an API served from a remote API provider, installing the local instance of the API at the local datacenter in response to a determination that the local instance of the API can be installed at the local datacenter, and routing subsequent requests from a same source that provided the request to the local instance of the API.

According to some embodiments, the method may include determining that the local instance of the API can be installed at the local datacenter based on an availability table indicating at least one API instance available for installation. The method may further include storing a local copy of the API and/or a pointer to a remote copy of the API at the local datacenter, where the local instance of the API may be installed from the local copy and/or the pointer. The remote copy of the API may be located at the remote API provider.

According to other embodiments, the method may include providing pricing information for installing the local instance of the API based on a pricing table. The pricing information may be based on a simple premium, a cost-of-operations, and/or an API subscription price. The method may further include refraining from reporting information about the local datacenter and/or the source for the request to the remote API provider, providing access to the local instance of the API to other customers of the local datacenter, and/or updating a Domain Name System (DNS) server for the remote API provider to include the local instance of the API.

According to other examples, a scale-out service operable to locally installing remotely-served application programming interface (API) instances may include a request handler, a processing module, and a package deployer. The request handler may be configured to receive a request for a local datacenter to install a local instance of an API served from a remote API provider. The processing module may be configured to determine that the local instance of the API can be installed at the local datacenter and route subsequent requests from a customer that provided the request to the local instance of the API. The package deployer may be configured to install the local instance of the API at the local datacenter.

According to some embodiments, the processing module may be configured to determine that the local instance of the API can be installed at the local datacenter based on an availability table indicating at least one API instance available for installation. The processing module may be further configured to store a local copy of the API and/or a pointer to a remote copy of the API at the local datacenter, and the package deployer may be configured to install the local instance of the API from the local copy and/or the pointer. The remote copy of the API may be located at the remote API provider.

According to other embodiments, the processing module may be further configured to provide pricing information for installing the local instance of the API based on a pricing table. The pricing information may be based on a simple premium, a cost-of-operations, and/or an API subscription price. The processing module may be further configured to refrain from reporting information about the local datacenter and/or the source for the request to the remote API provider, provide access to the local instance of the API to other customers of the local datacenter, and/or update a Domain Name System (DNS) server for the remote API provider to include the local instance of the API.

According to further examples, a cloud-based datacenter configured to locally install remotely-served application programming interface (API) instances may include a datacenter controller and at least one virtual machine (VM) operable to be executed on one or more physical machines. The datacenter controller may be configured to receive a request for the datacenter to install a local instance of an API served from a remote API provider, install the local instance of the API on the at least one VM in response to a determination that the local instance of the API can be installed on the at least one VM, and routing subsequent requests to the API from a customer that provided the request to the local instance of the API.

According to some embodiments, the controller may be configured to determine that the local instance of the API can be installed on the at least one VM based on an availability table indicating at least one API instance available for installation. The controller may be further configured to store a local copy of the API and/or a pointer to a remote copy of the API at the datacenter and install the local instance of the API from the local copy and/or the pointer. The remote copy of the API may be located at the remote API provider.

According to other embodiments, the controller may be further configured to provide pricing information for installing the local instance of the API based on a pricing table. The pricing information may be based on a simple premium, a cost-of-operations, and/or an API subscription price. The controller may be further configured to refrain from reporting information about the datacenter and/or the source for the request to the remote API provider, provide access to the local instance of the API to other customers of the datacenter, and/or update a Domain Name System (DNS) server for the remote API provider to include the local instance of the API.

According to yet further examples, an application programming interface (API) co-location service for co-locating API instances for a customer may include a mapping service, a processing module, and a scale-out service. The mapping service may be configured to identify a first API used by the customer and installed at a first datacenter and a second API used by the customer and installed at a second datacenter. The processing module may be configured to determine whether the first API and the second API can be co-located at the first datacenter. The scale-out service may be configured to install an instance of the second API at the first datacenter in response to a determination that the first API and the second API can be co-located at the first datacenter.

According to some embodiments, the mapping service, the processing module, and/or the scale-out service may be provided by the first datacenter. The processing module may be configured to determine whether the first API and the second API can be co-located at the first datacenter based on an availability table indicating at least one API instance available for installation. The processing module may be further configured to store a local copy of the second API and/or a pointer to a remote copy of the second API at the first datacenter, and the scale-out service may be configured to install the instance of the second API from the local copy and/or the pointer. The remote copy of the second API may be located at the second datacenter.

According to other embodiments, the processing module may be configured to provide pricing information for installing the instance of the second API to the customer based on a pricing table. The pricing information may be based on a simple premium, a cost-of-operations, and/or an API subscription price. The processing module may be further configured to refrain from reporting information about the first datacenter and/or the customer to a provider of the second API, provide access to the instance of the second API to other customers, and/or update a Domain Name System (DNS) server for a provider of the second API to include the instance of the second API.

According to some examples, a computer readable medium may store instructions which, when executed on one or more computing devices, execute a method for locally installing remotely-served API instances. The instructions may include receiving a request for a local datacenter to install a local instance of an API served from a remote API provider, installing the local instance of the API at the local datacenter in response to a determination that the local instance of the API can be installed at the local datacenter, and routing subsequent requests from a same source that provided the request to the local instance of the API.

According to some embodiments, the instructions may include determining that the local instance of the API can be installed at the local datacenter based on an availability table indicating at least one API instance available for installation. The instructions may further include storing a local copy of the API and/or a pointer to a remote copy of the API at the local datacenter, where the local instance of the API may be installed from the local copy and/or the pointer. The remote copy of the API may be located at the remote API provider.

According to other embodiments, the instructions may include providing pricing information for installing the local instance of the API based on a pricing table. The pricing information may be based on a simple premium, a cost-of-operations, and/or an API subscription price. The instructions may further include refraining from reporting information about the local datacenter and/or the source for the request to the remote API provider, providing access to the local instance of the API to other customers of the local datacenter, and/or updating a Domain Name System (DNS) server for the remote API provider to include the local instance of the API.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs miming on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, ail ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to, " "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to locally install remotely-served application programming interface (API) instances, the method comprising:

receiving, from a mapping service, an identity of one or more API instances used by a customer deployment and one or more distinct datacenters that host one or more remote API providers, the one or more remote API providers serving each of the one or more API instances; and consolidating the one or more API instances to a same datacenter through co-location such that a number of datacenters involved in the customer deployment and a number of potential points of failure are reduced by:

receiving a request for a local datacenter to install a local instance of an API from the one or more API instances served from a remote API provider of the one or more remote API providers;

storing at least one of a local copy of the API and a pointer to a remote copy of the API at the local datacenter;

in response to a determination that the local instance of the API can be installed at the local datacenter, installing the local instance of the API at the local datacenter, wherein the local instance of the API is installed from at least one of the local copy of the API and the pointer to the remote copy of the API; and routing subsequent requests from a source that provided the request to the local instance of the API by;

intercepting subsequent network requests;

converting the subsequent network requests into local requests; and re-routing the local requests to the local instance of the API.

2. The method of claim 1, further comprising determining, that the local instance of the API can be installed at the local datacenter based on an availability table that indicates at least one API instance available for installation.

3. The method of claim 1, further comprising providing pricing information for installation of the local instance of the API based on a pricing table.

4. The method of claim 3, wherein the pricing information is based on at least one of a simple premium, a cost-of-operations, and an API subscription price.

5. The method of claim 1, further comprising refraining from reporting information about at least one of the local datacenter and the source that provided the request to the remote API provider.

6. The method of claim 1, further comprising providing access to the local instance of the API to other customers of the local datacenter.

7. The method of claim 6, further comprising, updating a Domain Name System (DNS) server for the remote API provider to include the local instance of the API.

8. A scale-out server operable to locally install remotely-served application programming interface (API) instances, the server comprising:
 a memory configured to store instructions; and
 a processor coupled to the memory, wherein the processor in conjunction with the instructions is configured to:
  receive, from a mapping service, an identity of one or more API instances used by a customer deployment and one or more distinct datacenters that host one or more remote API providers, the one or more remote API providers serving each of the one or more API instances; and
  consolidate the one or more API instances to a same datacenter through co-location such that a number of datacenters involved in the customer deployment and a number of potential points of failure are reduced by:
   receiving a request for a local datacenter to install a local instance of an API from the one or more API instances served from a remote API provider of the one or more remote API providers;
   storing at least one of a local copy of the API and a pointer to a remote copy of the API at the local datacenter;
   determining that the local instance of the API can be installed at the local datacenter; and
   routing subsequent requests from a customer that provided the request to the local instance of the API by:
    intercepting subsequent network requests;
    converting the subsequent network requests into local requests; and
    re-routing the local requests to the local instance of the API; and
   installing the local instance of the API at the local datacenter, from at least one of the local copy of the API and the pointer to the remote copy of the API.

9. The service of claim 8, wherein the processor is further configured to determine that the local instance of the API can be installed at the local datacenter based on an availability table indicating at least one API instance available for installation.

10. The service of claim 8, wherein the remote copy of the API is located at the remote API provider.

11. The service of claim 8, wherein the processor is further configured to provide pricing information for installation of the local instance of the API based on a pricing table.

12. The service of claim 11, wherein the pricing information is based on at least one of a simple premium, a cost-of-operations, and an API subscription price.

13. The service of claim 8, wherein the processor is further configured to refrain from reporting information about at least one of the local datacenter and the customer to the remote API provider.

14. The service of claim 8, wherein the processor is further configured to provide access to the local instance of the API to other customers of the local datacenter.

15. The service of claim 14, wherein the processor is further configured to update a Domain Name System (DNS) server for the remote API provider to include the local instance of the API.

16. A datacenter configured to locally install remotely-served application programming interface (API) instances, the datacenter comprising:
 at least one virtual machine (VM), and
 a server configured to execute the at least one VM, the server comprising:
  a memory configured to store instructions; and
  a processor coupled to the memory, wherein the processor in conjunction with the instructions is configured to:
   receive, from a mapping service, an identity of one or more API instances used by a customer deployment and one or more distinct datacenters that host one or more remote API providers, the one or more remote API providers serving each of the one or more API instances; and
   consolidate the one or more API instances to a same datacenter through co-location such that a number of datacenters involved in the customer deployment and a number of potential points of failure are reduced by:
    receiving a request for the datacenter to install a local instance of an API from the one or more API instances served from a remote API provider of the one or more remote API providers;
    storing at least one of a local copy of the API and a pointer to a remote copy of the API at the datacenter;
    in response to a determination that the local instance of the API can be installed on the at least one VM, installing the local instance of the API from at least one of the local copy of the API and the pointer to the remote copy of the API on the at least one VM; and
    routing subsequent requests to the API from a customer that provided the request to the local instance of the API by:
     intercepting subsequent network requests;
     converting the subsequent network requests into local requests; and
     re-routing the local requests to the local instance of the API.

17. The datacenter of claim 16, wherein the processor is further configured to determine that the local instance of the API can be installed on the at least one VM based on an availability table indicating at least one API instance available for installation.

18. The datacenter of claim 16, wherein the remote copy of the API is located at the remote API provider.

19. The datacenter of claim 16, wherein the processor is further configured to provide pricing information for installation of the local instance of the API based on a pricing table.

20. The datacenter of claim 19, wherein the pricing information is based on at least one of a simple premium, a cost-of-operations, and an API subscription price.

21. The datacenter of claim 16, wherein the processor is further configured to refrain from reporting information about at least one of the datacenter and the customer to the remote API provider.

22. The datacenter of claim 16, wherein the processor is further configured to provide access to the local instance of the API to other customers of the datacenter.

23. The datacenter of claim 22, wherein the processor is further configured to update a Domain Name System (DNS) server for the remote API provider to include the local instance of the API.

* * * * *